US008508652B2

(12) United States Patent
Albu et al.

(10) Patent No.: US 8,508,652 B2
(45) Date of Patent: Aug. 13, 2013

(54) AUTOFOCUS METHOD

(75) Inventors: Felix Albu, Bucharest (RO); Vlad Poenaru, Bucharest (RO); Alexandru Drimbarean, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 367 days.

(21) Appl. No.: 13/020,805

(22) Filed: Feb. 3, 2011

(65) Prior Publication Data
US 2012/0200725 A1 Aug. 9, 2012

(51) Int. Cl.
G03B 13/00 (2006.01)
H04N 5/232 (2006.01)
H04N 5/228 (2006.01)
G06K 9/40 (2006.01)
G06K 9/36 (2006.01)
G06K 9/64 (2006.01)

(52) U.S. Cl.
USPC ............. 348/349; 348/208.1; 348/222.1; 348/345; 348/354; 382/255; 382/276; 382/279

(58) Field of Classification Search
USPC ............. 348/208.99–208.16, 222.1, 335, 348/345–357; 382/162–167, 254–275; 396/72–152
See application file for complete search history.

(56) References Cited

U.S. PATENT DOCUMENTS 4,448,510 A  5/1984  Murakoshi
5,508,734 A  4/1996  Baker et al.
5,926,212 A * 7/1999  Kondo ............... 348/207.99
6,122,004 A * 9/2000  Hwang ............... 348/208.13
6,246,790 B1  6/2001  Huang et al.
(Continued)

FOREIGN PATENT DOCUMENTS

EP      2037320 A1    3/2009
WO  2007/093199 A2   8/2007
(Continued)

OTHER PUBLICATIONS

Sinjini Mitra, Marios Savvides, Gaussian Mixture Models Based on the Frequency Spectra for Human Identification and Illumination Classification, 4th IEEE Workshop on Automatic Identification Advanced Technologies, 2005, Buffalo, NY, USA Oct. 17-18, 2005, pp. 245-250.

(Continued)

Primary Examiner — Michael Osinski
(74) Attorney, Agent, or Firm — Andrew V. Smith

(57) ABSTRACT

An autofocus method includes acquiring multiple images each having a camera lens focused at a different focus distance. A sharpest image is determined among the multiple images. Horizontal, vertical and/or diagonal integral projection (IP) vectors are computed for each of the multiple images. One or more IP vectors of the sharpest image is/are convoluted with multiple filters of different lengths to generate one or more filtered IP vectors for the sharpest image. Differences are computed between the one or more filtered IP vectors of the sharpest image and one or more IP vectors of at least one of the other images of the multiple images. At least one blur width is estimated between the sharpest image and the at least one of the other images of the multiple images as a minimum value among the computed differences over a selected range. The steps are repeated one or more times to obtain a sequence of estimated blur width values. A focus position is adjusted based on the sequence of estimated blur width values.

36 Claims, 3 Drawing Sheets

(56) References Cited

U.S. PATENT DOCUMENTS

| | | | |
|---|---|---|---|
| 6,407,777 B1 | 6/2002 | DeLuca | |
| 6,577,821 B2 | 6/2003 | Malloy-Desormeaux | |
| 6,747,690 B2 | 6/2004 | Molgaard | |
| 6,930,718 B2 | 8/2005 | Parulski et al. | |
| 7,102,638 B2 | 9/2006 | Raskar et al. | |
| 7,103,227 B2 | 9/2006 | Raskar et al. | |
| 7,103,357 B2 | 9/2006 | Kirani et al. | |
| 7,206,449 B2 | 4/2007 | Raskar et al. | |
| 7,218,792 B2 | 5/2007 | Raskar et al. | |
| 7,295,720 B2 | 11/2007 | Raskar | |
| 7,317,815 B2 | 1/2008 | Steinberg et al. | |
| 7,352,394 B1 | 4/2008 | DeLuca et al. | |
| 7,359,562 B2 | 4/2008 | Raskar et al. | |
| 7,362,368 B2 | 4/2008 | Steinberg et al. | |
| 7,474,341 B2 | 1/2009 | DeLuca et al. | |
| 7,518,635 B2 * | 4/2009 | Kawahara et al. | 348/208.6 |
| 7,606,417 B2 | 10/2009 | Steinberg et al. | |
| 7,634,109 B2 | 12/2009 | Steinberg et al. | |
| 7,636,486 B2 | 12/2009 | Steinberg et al. | |
| 7,639,888 B2 | 12/2009 | Steinberg et al. | |
| 7,639,889 B2 | 12/2009 | Steinberg et al. | |
| 7,660,478 B2 | 2/2010 | Steinberg et al. | |
| 7,676,108 B2 | 3/2010 | Steinberg et al. | |
| 7,680,342 B2 | 3/2010 | Steinberg et al. | |
| 7,687,778 B2 | 3/2010 | Wang et al. | |
| 7,692,696 B2 | 4/2010 | Steinberg et al. | |
| 7,693,408 B1 | 4/2010 | Tsai | |
| 7,697,778 B2 | 4/2010 | Steinberg et al. | |
| 7,773,118 B2 | 8/2010 | Florea et al. | |
| 7,787,022 B2 | 8/2010 | Steinberg et al. | |
| 7,796,822 B2 | 9/2010 | Steinberg et al. | |
| 8,212,882 B2 | 7/2012 | Florea et al. | |
| 2001/0026632 A1 | 10/2001 | Tamai | |
| 2004/0090551 A1* | 5/2004 | Yata | 348/354 |
| 2005/0270410 A1 | 12/2005 | Takayama | |
| 2006/0140455 A1 | 6/2006 | Costache et al. | |
| 2006/0239579 A1 | 10/2006 | Ritter | |
| 2007/0003276 A1 | 1/2007 | Kim | |
| 2007/0030381 A1 | 2/2007 | Maeda | |
| 2007/0285528 A1 | 12/2007 | Mise et al. | |
| 2007/0296833 A1 | 12/2007 | Corcoran et al. | |
| 2008/0043121 A1 | 2/2008 | Prilutsky et al. | |
| 2008/0143854 A1 | 6/2008 | Steinberg et al. | |
| 2008/0218868 A1 | 9/2008 | Hillis et al. | |
| 2008/0219517 A1 | 9/2008 | Blonk et al. | |
| 2008/0219581 A1 | 9/2008 | Albu et al. | |
| 2008/0252773 A1 | 10/2008 | Oishi | |
| 2008/0259176 A1* | 10/2008 | Tamaru | 348/222.1 |
| 2008/0309769 A1 | 12/2008 | Albu et al. | |
| 2008/0316328 A1 | 12/2008 | Steinberg et al. | |
| 2008/0317379 A1 | 12/2008 | Steinberg et al. | |
| 2009/0002514 A1 | 1/2009 | Steinberg et al. | |
| 2009/0003661 A1 | 1/2009 | Ionita et al. | |
| 2009/0003708 A1 | 1/2009 | Steinberg et al. | |
| 2009/0059061 A1 | 3/2009 | Yu et al. | |
| 2009/0080713 A1 | 3/2009 | Bigioi et al. | |
| 2009/0115915 A1 | 5/2009 | Steinberg et al. | |
| 2009/0153725 A1* | 6/2009 | Kawahara | 348/347 |
| 2009/0167893 A1 | 7/2009 | Susanu et al. | |
| 2009/0179998 A1 | 7/2009 | Steinberg et al. | |
| 2009/0179999 A1 | 7/2009 | Albu et al. | |
| 2009/0196466 A1 | 8/2009 | Capata et al. | |
| 2009/0238487 A1* | 9/2009 | Nakagawa et al. | 382/263 |
| 2009/0268080 A1 | 10/2009 | Song et al. | |
| 2009/0273685 A1 | 11/2009 | Ciuc et al. | |
| 2009/0303342 A1 | 12/2009 | Corcoran et al. | |
| 2009/0303343 A1 | 12/2009 | Drimbarean et al. | |
| 2009/0310885 A1 | 12/2009 | Tamaru | |
| 2010/0039525 A1 | 2/2010 | Steinberg et al. | |
| 2010/0060727 A1 | 3/2010 | Steinberg et al. | |
| 2010/0085436 A1* | 4/2010 | Ohno | 348/208.1 |
| 2010/0111440 A1 | 5/2010 | Chai et al. | |
| 2010/0128163 A1 | 5/2010 | Nagasaka et al. | |
| 2010/0188535 A1* | 7/2010 | Mitsuya et al. | 348/241 |
| 2010/0194869 A1* | 8/2010 | Matsuzaki | 348/65 |
| 2010/0208091 A1 | 8/2010 | Chang | |
| 2010/0271494 A1* | 10/2010 | Miyasako | 348/208.1 |
| 2010/0283868 A1 | 11/2010 | Clark et al. | |
| 2010/0329582 A1 | 12/2010 | Albu et al. | |
| 2011/0002545 A1 | 1/2011 | Steinberg et al. | |
| 2011/0013044 A1 | 1/2011 | Steinberg et al. | |
| 2011/0135208 A1 | 6/2011 | Atanassov et al. | |
| 2011/0216156 A1 | 9/2011 | Bigioi et al. | |
| 2011/0249173 A1* | 10/2011 | Li et al. | 348/349 |
| 2012/0075492 A1 | 3/2012 | Nanu et al. | |
| 2012/0120269 A1 | 5/2012 | Capata et al. | |
| 2012/0120283 A1 | 5/2012 | Capata et al. | |
| 2012/0218461 A1 | 8/2012 | Sugimoto | |
| 2012/0249725 A1 | 10/2012 | Corcoran et al. | |
| 2012/0249727 A1 | 10/2012 | Corcoran et al. | |
| 2012/0249841 A1 | 10/2012 | Corcoran et al. | |
| 2013/0053101 A1 | 2/2013 | Tsai et al. | |

FOREIGN PATENT DOCUMENTS

| | | |
|---|---|---|
| WO | 2009/036793 A1 | 3/2009 |
| WO | 2012/041892 A1 | 4/2012 |
| WO | 2012/062893 A2 | 5/2012 |
| WO | 2012/062893 A3 | 7/2012 |

OTHER PUBLICATIONS

Kouzani, A Z, Illumination-effects compensation in facial images, IEEE International Conference on Systems, Man, and Cybernetics, 1999, IEEE SMS '99 Conference Proceedings, Tokyo, Japan Oct. 12-15, 1999, vol. 6, pp. 840-844.

Matthew Turk, Alex Pentland, Eigenfaces for Recognition, Journal of Cognitive Neuroscience, 1991, vol. 3, Issue 1, pp. 71-86.

H. Lai, P. C. Yuen, and G. C. Feng, Face recognition using holistic Fourier invariant features, Pattern Recognition, 2001, vol. 34, pp. 95-109, 2001. Retrieved from URL: http://digitalimaging.inf.brad.ac.uk/publication/pr34-1.pdf.

Jing Huang, S. Ravi Kumar, Mandar Mitra, Wei-Jing Zhu, Ramin Zabih, Image Indexing Using Color Correlograms, IEEE Conf. Computer Vision and Pattern Recognition, (CVPR '97) pp. 762-768, 1997.

Markus Stricker and Markus Orengo, Similarity of color images, SPIE Proc., vol. 2420, pp. 381-392, 1995.

Ronny Tjahyadi, Wanquan Liu, Svetha Venkatesh, Application of the DCT Energy Histogram for Face Recognition, in Proceedings of the 2nd International Conference on Information Technology for Application (ICITA 2004), 2004, pp. 305-310.

S. J. Wan, P. Prusinkiewicz, S. L. M. Wong, Variance-based color image quantization for frame buffer display, Color Research and Application, vol. 15, No. 1, pp. 52-58, 1990.

Tianhorng Chang and C.-C. Jay Kuo, Texture Analysis and Classification with Tree-Structured Wavelet Transform, IEEE Trans. Image Processing, vol. 2. No. 4, Oct. 1993, pp. 429-441.

Zhang Lei, Lin Fuzong, Zhang Bo, A CBIR method based on color-spatial feature. IEEE Region 10th Ann. Int. Conf. 1999, Tencon'99, Cheju, Korea, 1999.

PCT Notification of Transmittal of the International Search Report and the Written Opinion of the International Searching Authority, or the Declaration, for PCT Application No. PCT/EP2011/069904, report dated May 16, 2012, 17 Pages.

Karen P. Hollingsworth, Kevin W. Bowyer, Patrick J. Flynn: "Image Averaging for Improved Iris Recognition", Advances in Biometrics, by M. Tistarelli, M.S. Nixon (Eds.): ICB 2009, LNCS 5558, Springer Berlin Heidelberg, Berlin Heidelberg, Jun. 2, 2009, pp. 1112-1121, XP019117900, ISBN: 978-3-642-01792-6.

PCT Communication in Cases for Which No Other Form is Applicable, Form PCT/ISA/224, for PCT Application No. PCT/EP2011/069904, dated Nov. 11, 2011.

PCT Notification of Transmittal of the International Search Report and the Written Opinion of the International Searching Authority, or the Declaration, for PCT Application No. PCT/EP2011/069904, report dated Jun. 22, 2012, 21 pages.

Karen P Hollingsworth, Kevin W. Bowyer, Patrick J. Flynn: "Image Averaging for Improved Iris Recognition", Advances in Biometrics, by M. Tistarelli, M.S. Nixon (Eds.): ICB 2009, LNCS 5558, Springer Berlin Heidelberg, Berlin Heidelberg, Jun. 2, 2009, pp. 1112-1121, XP019117900, ISBN: 978-3-642-01792-6.

Sang Ku Kim, Sang Rae Park and Joan Ki Paik: Simultaneous Out-Of-Focus Blur Estimation and Restoration for Digital Auto-Focusing System, Aug. 1, 1998, vol. 44, No. 3, pp. 1071-1075, XP011083715.

Hamm P., Schulz J. and Englmeier K.-H.: "Content-Based Autofocusing in Automated Microscopy", Image Analysis Stereology, vol. 29, Nov. 1, 2010, pp. 173-180, XP002677721.

Co-pending U.S. Appl. No. 12/820,034.
Co-pending U.S. Appl. No. 12/820,086.
Co-pending U.S. Appl. No. 12/901,577.
Co-pending U.S. Appl. No. 12/944,701.
Co-pending U.S. Appl. No. 12/944,703.
Co-pending U.S. Appl. No. 12/959,320.

Moghaddam M. E., Out of Focus Blur Estimation Using Genetic Algorithm, Journal of Computer Science, 2008, Science Publications, vol. 4 (4), 298-304.

K. Sauer and B. Schwartz, Efficient Block Motion Estimation Using Integral Projections, IEEE Trans. Circuits, Systems for video Tech., 1996, vol. 6, No. 5, October, pp. 513-518.

Wei Huang, Zhongliang Jing, Evaluation of focus measures in multi-focus image fusion, Pattern Recognition Letters, Mar. 2007, v.28 n. 4, p. 493-500.

M. E. Moghaddam, Out of focus blur estimation using genetic algorithm, in Proc. 15th International Conf. on Systems, Signals and Image Processing, IWSSIP 2008, pp. 417-420.

Wikipedia reference: Autofocus, retrieved on Feb. 3, 2011, URL: http://en.wikipedia.orgiwiki/Autofocus, 5 Pages.

PCT Notification of the Transmittal of the International Search Report and the Written Opinion of the International Search Authority, or the Declaration, for PCT Application No. PCT/EP2011/066835, report dated Jan. 18, 2012, 12 Pages.

Sang-Yong Lee, Jae-Tack Yoo, Yogendera Kumar, and Soo-Won Kim, Reduced Energy-Ratio Measure for Robust Autofocusing in Digital Camera, IEEE Signal Processing Letters, vol. 16, No. 2, Feb. 2009, pp. 133-136.

Jaehwan Jeon, Jinhee Lee, and Joonki Paik, Robust Focus Measure for Unsupervised Auto-Focusing Based on Optimum Discrete Cosine Transform Coefficients, IEEE Transactions on Consumer Electronics, vol. 57, No. 1, Feb. 2011, pp. 1-5.

Felix Albu, Corneliu Florea, Adrian Zamfir, Alexandru Drimbarean, 10.4-3 Low Complexity Global Motion Estimation Techniques for Image Stabilization, IEEE, Aug. 2008, pp. 1-4244-1459.

Masahiro Watanabe, Shree K. Nayar: Short Papers Telecentric Optics for Focus Analysis, IEEE Transactions on Pattern Analysis and Machine Intelligence, vol. 19, No. 12, Dec. 1997, pp. 1360-1365.

A. Ben Hamza, Yun He, Hamid Krim, and Alan Willsky: A multiscale approach to pixel-level image fusion, Integrated Computer-Aided Engineering, IOS Press, No. 12, 2005 pp. 135-146.

CIPA DC-007-Translation-2009: Multi-Picture Format, Established on Feb. 4, 2009, prepared by Standardization Committee, published by Camera & Imaging Products Association, 61 pages.

U.S. Appl. No. 13/541,650, filed Jul. 3, 2012, entitled: Method and System for Correcting a Distorted Input Image.

Non-Final Rejection, dated Apr. 17, 2013, for U.S. Appl. No. 12/944,701, filed Nov. 11, 2010.

Non-Final Rejection, dated Apr. 15, 2013, for U.S. Appl. No. 12/944,703, filed Nov. 11, 2010.

PCT Notification of Transmittal of International Preliminary Report on Patentability Chapter I, International Preliminary Report on Patentability Chapter I, for PCT Application No. PCT/EP2011/066835, report dated Apr. 11, 2013, 9, Pages.

Paul Viola and Michael Jones: Rapid Object Detection Using a Boosted Cascade of Simple Features, Mitsubishi Electric Research Laboratories, Inc., 2004, TR-2004-043 May 2004, 13 pages.

Non-Final Rejection, dated Mar. 27, 2013, for U.S. Appl. No. 12/959,320, filed Dec. 2, 2010.

* cited by examiner

The Blur kernel (width = 11)

The Integral Projection Vector of the Blur Kernel

AUTOFOCUS METHOD

BACKGROUND

Autofocus systems typically rely on one or more sensors to determine correct focus. Some AF systems rely on a single sensor, while others use an array of sensors. Most modern SLR cameras use through-the-lens optical AF sensors, with a separate sensor array providing light metering, although the latter can be programmed to prioritize its metering to the same area as one or more of the AF sensors.

Through-the-lens optical autofocusing is now often speedier and more precise than can be achieved manually with an ordinary viewfinder, although more precise manual focus can be achieved with special accessories such as focusing magnifiers. Autofocus accuracy within ⅓,of the depth of field (DOF) at the widest aperture of the lens is not uncommon in professional AF SLR cameras.

Most multi-sensor AF cameras allow manual selection of the active sensor, and many offer automatic selection of the sensor using algorithms which attempt to discern the location of the subject. Some AF cameras are able to detect whether the subject is moving towards or away from the camera, including speed and acceleration data, and keep focus on the subject, which is a function used mainly in sports and other action photography. On Canon cameras, this is known as AI servo, while on Nikon cameras it is known as "Continuous Focus".

The data collected from AF sensors is used to control an electromechanical system that adjusts the focus of the optical system. A variation of autofocus is called an electronic rangefinder, a system in which focus data are provided to the operator, but adjustment of the optical system is still performed manually.

The speed of the AF system is highly dependent on the maximum aperture offered by the lens. F-stops of around f/2 to f/2.8 are generally considered optimal in terms of focusing speed and accuracy. Faster lenses than this (e.g.: f/1.4or f/1.8) typically have very low depth of field, meaning that it takes longer to achieve correct focus, despite the increased amount of light.

Most consumer camera systems will only autofocus reliably with lenses that have a maximum aperture of at least f/5.6, while professional models can often cope with lenses that have a maximum aperture of f/8, which is particularly useful for lenses used in conjunction with teleconverters.

History

Between 1960, and 1973, Leitz (Leica) patented an array of autofocus and corresponding sensor technologies. At photokina 1976, Leica had presented a camera based on their previous development, named Correfot, and in 1978, they displayed an SLR camera with fully operational autofocus. The first mass-produced autofocus camera was the Konica C35, AF, a simple point and shoot model released in 1977. The Polaroid SX-70, Sonar OneStep was the first autofocus single-lens reflex camera, released in 1978. The Pentax ME-F, which used focus sensors in the camera body coupled with a motorized lens, became the first autofocus 35, mm SLR in 1981, In 1983, Nikon released the F3AF, their first autofocus camera, which was based on a similar concept to the ME-F. The Minolta Maxxum 7000, released in 1985, was the first SLR with an integrated autofocus system, meaning both the AF sensors and the drive motor were housed in the camera body, as well as an integrated film advance winder—which was to become the standard configuration for SLR cameras from this manufacturer, as it would for Nikon. Canon, however, elected to develop their EOS system with motorised lenses instead. More recently, Nikon have also adopted this strategy with their AF-S range of lenses; their entry-level DSLRs do not have a focus motor in the body.

A useful background discussion of autofocus is found at http://en.wikipedia.org/wiki/Autofocus, hereby incorporated by reference.

Active Autofocus

Active AF systems measure distance to the subject independently of the optical system, and subsequently adjust the optical system for correct focus. There are various ways to measure distance, including ultrasonic sound waves and infrared light. In the first case, sound waves are emitted from the camera, and by measuring the delay in their reflection, distance to the subject is calculated. Polaroid cameras including the Spectra and SX-70, were known for successfully applying this system. In the latter case, infrared light is usually used to triangulate the distance to the subject. Compact cameras including the Nikon 35TiQD and 28TiQD, the Canon AF35M, and the Contax T2, and T3, as well as early video cameras, used this system. An exception to the two-step approach is the mechanical autofocus provided in some enlargers, which adjust the lens directly.

Passive Autofocus

Passive AF systems determine correct focus by performing passive analysis of the image that is entering the optical system. They generally do not direct any energy, such as ultrasonic sound or infrared light waves, toward the subject. However, an autofocus assist beam of usually infrared light may be used when there is not enough light to take passive measurements. Passive autofocusing can be achieved by phase detection or contrast measurement.

Phase Detection

Phase detection is achieved by dividing the incoming light into pairs of images and comparing them. SIR TTL passive phase detection (secondary image registration, through the lens) is often used in film and digital SLR cameras. The system uses a beam splitter (implemented as a small semi-transparent area of the main reflex mirror, coupled with a small secondary mirror) to direct light to an AF sensor at the bottom of the camera. Two optical prisms capture the light rays coming from the opposite sides of the lens and divert it to the AF sensor, creating a simple rangefinder with a base identical to the lens's diameter. The two images are then analyzed for similar light intensity patterns (peaks and valleys) and the phase difference is calculated in order to find if the object is in front focus or back focus position. This instantly gives the exact direction of focusing and amount of focus ring's movement.

Although AF sensors are typically one-dimensional photosensitive strips (only a few pixels high and a few dozen wide), some modern cameras (Canon EOS-1V, Canon EOS-1D, Nikon D2X) feature Area SIR sensors that are rectangular in shape and provide two-dimensional intensity patterns for a finer-grain analysis. Cross-type (CT) focus points have a pair of sensors oriented at 90° to one another, although one sensor typically requires a larger aperture to operate than the other. Some cameras (Canon EOS-1V, Canon EOS-1D, Canon EOS 30D/40D) also have a few 'high precision' focus points with an additional set of prisms and sensors; they are only active with 'fast lenses' of certain focal ratio. Extended precision comes from the increased diameter of such lenses, so the base of the 'range finder' can be wider. Fujifilm announced a compact camera with phase detection AF, which sensor is part of a CCD (EXR sensor with phase detection pixels).

Contrast Measurement

Contrast measurement is achieved by measuring contrast within a sensor field, through the lens. The intensity difference between adjacent pixels of the sensor naturally increases with correct image focus. The optical system can thereby be adjusted until the maximum contrast is detected. In this method, AF does not involve actual distance measurement at all and is generally slower than phase detection systems, especially when operating under dim light. Furthermore, as the autofocus system does not calculate whether the subject is in front focus or back focus, focus tracking is not feasible. As it does not use a separate sensor, however, contrast-detect autofocus can be more flexible (as it is implemented in software) and potentially more accurate. This is a common method in video cameras and consumer-level digital cameras that lack shutters and reflex mirrors. Most DSLRs use this method (or a hybrid of both contrast and phase detection autofocus) when focusing in their live-view modes. Mirrorless interchangeable-lens cameras, including Micro Four Thirds, exclusively use contrast measurement autofocus, and their manufacturers claim performance comparable to phase detection systems.

Technically it can be implemented as high pass filter and some system which conscientiously moves lens around the point where filter output is highest. Digital processing is not required. Photo cameras sweep only once before taking picture, while video cameras need to sweep continuously in small steps that are almost unnoticeable. This method can also be used to precisely focus security cameras, without seeing actual image.

Comparison of Active and Passive Systems

High contrast bands can be projected onto low contrast subjects, seen here for Canon EOS 100Active systems will typically not focus through windows, since sound waves and infrared light are reflected by the glass. With passive systems this will generally not be a problem, unless the window is stained. Accuracy of active autofocus systems is often considerably less than that of passive systems. Active systems may also fail to focus a subject that is very close to the camera (e.g., macro photography).

Passive systems may not find focus when the contrast is low, notably on large single-colored surfaces (walls, blue sky, etc.) or in low-light conditions. Passive systems are dependent on a certain degree of illumination to the subject (whether natural or otherwise), while active systems may focus correctly even in total darkness when necessary. Some external flash units have a special low-level illumination mode (usually orange/red light) which can be activated during auto-focus operation to allow the camera to focus.

Autofocus Assist Lamp

Many passive autofocus systems struggle in low-light settings, leading to focus failure. To correct this problem, some cameras have a built-in lamp that illuminates the subject. This autofocus assist lamp projects a regular pattern of visible or IR light onto the subject, which the camera's autofocus system uses to achieve focus. Many cameras that do not have a dedicated autofocus assist lamp instead use their built-in flash, illuminating the subject with a bright stroboscopic burst of light. Like a dedicated autofocus assist lamp, this method aids the autofocus system, but is very irritating to subjects; compare with flashing used to reduce the red-eye effect. In some cases, external flash guns have integrated autofocus assist lamps that replace the stroboscopic on-camera flash, with better and less annoying results. Another way to assist contrast based AF systems in low light is to beam a laser pattern on to the subject. This method is called Hologram AF laser and was used in Sony Cybershot cameras around the year 2003, for example in Sony's F707, F717, and F828, models.

Trap Focus

A trick called alternatively trap focus, focus trap, or catch-in-focus uses autofocus to take a shot when a subject moves into the focal plane (at the relevant focal point). This can be used to get a focused shot of a rapidly moving object, particularly in sports or wildlife photography, or alternatively to set a "trap" so that a shot can automatically be taken without a person present. This is done by using AF to detect but not set focus, using manual focus to set focus (or switching to manual after focus has been set), but then using focus priority to detect focus and only releasing the shutter when an object is in focus. The technique works by fixing a focal distance (turning AF off), then setting the shooting mode to "Single" (AF-S), or more specifically focus priority, then depressing the shutter when the subject moves into focus. The AF detects this (though it does not change the focus), and a shot is taken.

Trap focus is possible on some Pentax, Nikon, and Canon EOS cameras. The EOS 1D can do it using software on an attached computer, whereas cameras like the EOS 40D and 7D have a custom function (III-1, and III-4, respectively) which can stop the camera trying to focus after it fails. On EOS cameras without genuine trap focus, a hack called "almost trap focus" can be used, which achieves some of the effects of trap focus.

Further background is found at K. Sauer and B. Schwartz, 1996, ", Efficient Block Motion Estimation Using Integral Projections", *IEEE Trans. Circuits, Systems for video Tech.*, vol. 6, No. 5, October, pp. 513-518, Wei Huang, Zhongliang Jing, *Evaluation of focus measures in multi-focus image fusion*, Pattern Recognition Letters, v. 28, n. 4, p. 493-500, March 2007, and M. E. Moghaddam, "Out of focus blur estimation using genetic algorithm," in *Proc. 15th International Conf on Systems, Signals and Image Processing*, pp. 417-420, IWSSIP 2008, which are each hereby incorporated by reference.

BRIEF DESCRIPTIONS OF THE DRAWINGS

DETAILED DESCRIPTIONS OF THE EMBODIMENTS

Figure 1A:
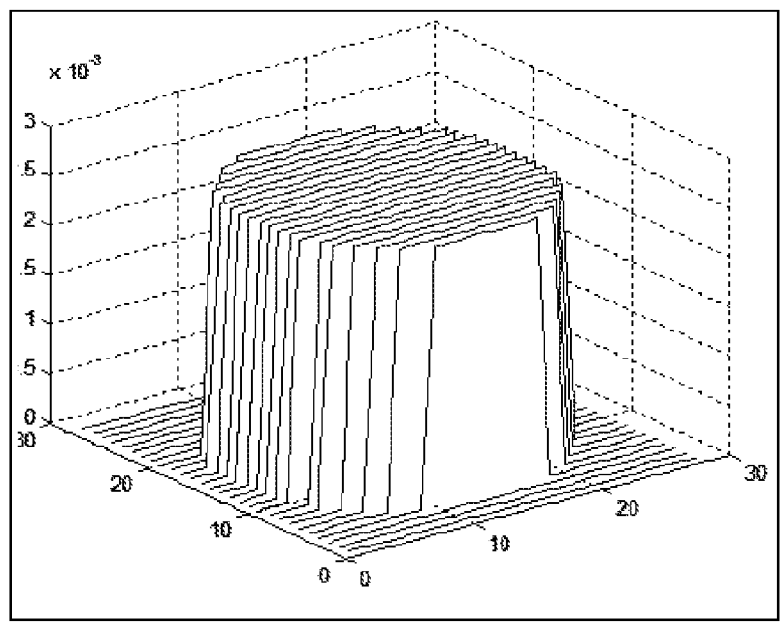
FIG. 1a, illustrates a representation of a blur kernel of width=11, in accordance with certain embodiments.

A method of automatically focusing a camera on a scene is provided, including acquiring multiple images each having a lens of the camera focused at a different focus distance. A sharpest image among the multiple images is determined. The method further includes computing horizontal, vertical and/or diagonal integral projection vectors for each of the multiple images. One or more integral projection vectors of the sharpest image are convoluted with multiple filters of different lengths to generate one or more filtered integral projection vectors for the sharpest image. Differences between the one or more filtered integral projection vectors of the sharpest image and one or more integral projection vectors of at least one of the other images of the multiple images are computed. At least one blur width between the sharpest image and the at least one of the other images of the multiple images is determined as a minimum value among the computed differences over a selected range. The method is repeated one or more times to obtain a sequence of estimated blur width values. A focus position is adjusted based on the sequence of estimated blur width values.

The determining of the sharpest image may involve a gradient image-based process. The differences may include absolute sums of differences or sums of squared differences. The multiple filters of different lengths may include integral projection vectors of blur kernels of different widths. The blur kernels may include Gaussian and/or circular averaging kernels. The minimum value may indicate a suitable filter length.

The method may also include downscaling or cropping lengths of the integral projection vectors in order to reduce complexity, applying a descent process to reduce a number of computations and/or computing errors at different interval lengths in order to avoid one or more local minima.

The adjusting of the focus position may include a smaller or greater adjustment, respectively, for smaller or greater estimated blur width values.

The method may also include estimating a focus kernel difference between the sharpest image and the at least one of the other images of the multiple images, and computing an approximate focus level position based on the estimated focus kernel difference. The method may further include refining the focus level position by acquiring one or more images close to the approximate focus level position and applying a gradient method to determine a best match.

Autofocus techniques in accordance with certain embodiments use integral projection techniques and estimate the kernel blur width between consecutive images. Certain of these techniques can operate on selected parts of one or both of the images (e.g., a detected face or eye or mouth regions of a face, or another object or region of interest such as an arbitrary, detected or selected foreground (or background) component of an image, or a detected object outside a moving or parked vehicle such as another vehicle, pedestrian or obstacle, or a component of a panorama image, among other image components). A focus measure is computed in certain embodiments for both images, and the maximum corresponds to the sharpest one. The Integral Projection (IP) vectors of the sharpest image are then successively convoluted in certain embodiments with a variable length filters vector and compared with the IP vectors of the second image. The absolute sum of differences between the filtered vectors is computed, and the length of the variable vector that leads to the minimum value over the selected range is provided as an estimate of the blur width between the images.

There is no absolute need to perform additional processing on an image to determine the sharpest image. The same described procedure can be applied using the integral projection vectors of each image. If the integral projection vectors of the sharpest image are filtered, then the blur width can be found using a technique in accordance with embodiments described herein. If the integral projection vectors of the blurrier image are filtered, then the determined blur width can be set to one in accordance with achieving a minimum error.

The sharpness measure is used in certain embodiments to decide what integral projection vectors are to be filtered. One example of a sharpness measure uses available integral projection vectors. The sum of absolute values of high-pass filtered integral projection vectors, e.g. IPV*[1, −1]) is calculated in this embodiment. A higher value is expected in the case of the sharper image. The sharpness measure provides more confidence in cases where sharp and slightly blurred image pairs are used.

A technique is provided that involves estimating the width of the blur between two (or more) images or image crops. Any of several widely understood focus measure methods can be used to find the sharpest image. One or more horizontal, vertical and/or diagonal integral projection vectors are calculated. In one embodiment, the horizontal and vertical integral projection vectors (i.e. the sum of all columns and rows respectively) are computed for both images. In another embodiment, a diagonal integral projection vector is computed. The integral projection vectors of the sharpest image are convoluted with filters with different lengths. The absolute sum of the difference between the filtered integral projection vectors of the sharpest image and the integral projection vectors of the blurred image is computed. The length of the variable vector that leads to the minimum value over the selected range estimates the blur width between images. The sum of the absolute differences can be replaced by the sum of squared differences. Also, for better accuracy, both horizontal and vertical projection profiles can be used, or horizontal and/or vertical and diagonal, among other combinations of one or two or more integral projection vectors.

The vectors used for convolution are the integral projection vectors of blur kernels with different widths. For a specific camera calibration, the variable width integral projection vectors can be obtained by the sum of unfocused pictures of one horizontal black line on a white paper, for example, followed by a normalization step. The profiles can be downscaled in order to reduce the complexity of the calculation, or the length of the full resolution profiles can be cropped. Also, a descent algorithm can be used in order to reduce the number of computations and not perform a full search on some or all investigated width values.

An example of a typical scenario of usage for such blur kernel size is provided in certain embodiments as follows. An image for a current focus level and another image with a different focus level are taken and used in the calculation described above. An estimate is obtained as to the size of the focus kernel difference between the two images. With that information and a lookup table with calibration data from the sensor and lens, an approximate focus level position is computed which will be deemed close enough to the ideal one. During the next steps, a constant number of images are captured with focus levels close to the "ideal" or "guessed" position. The best match, according to a gradient method, will be deemed to be the desired "ideal" focus.

Using this method, a constant number of steps are typically involved to determine the best focus for a given scene. This could have applications in real time systems and also represents an improvement over existing methods which are not strongly bounded in the number of steps. Techniques in accordance with certain embodiments can work on gradient images too. Another embodiment involves approximating the integral projection of a blur kernel with a box filter. A threshold is imposed to the sum of the columns of the blur kernel. Advantageous results may be found by using half of the maximum value. The resulting vector may be normalized in order to have a unity sum value. The threshold and image content serve to provide enhanced accuracy in width estimation. Techniques in accordance with certain embodiments can be extended in a more general case of finding a PSF support size in an example case of two available images including an under-exposed image and a blurred image pair.

Techniques in accordance with certain embodiments advantageously reduce the number of iterations involved in the autofocus process.

In accordance with certain embodiments, techniques are provided that involve estimating the width of the blur between two images or image crops. As mentioned, any of a variety of known focus measure methods can be used to find the sharpest image. Gradient image based methods are examples of advantageous techniques that may be applied in this regard (see, e.g., Wei Huang, Zhongliang Jing, *Evaluation of focus measures in multi-focus image fusion*, Pattern Recognition Letters, v. 28, n. 4, p. 493-500, March 2007, incorporated by reference). The horizontal and vertical integral projection vectors (e.g., the sum of all columns and rows, respectively) may be computed for both images, or a diagonal integral projection vector may be calculated, or a combination of one or more horizontal, vertical and/or diagonal integral projection vectors may be calculated. The integral projection vectors of the sharpest image are convoluted with filters with different lengths. The absolute sum of the difference between the filtered IP vectors of the sharpest image and the IP vectors of the blurred image is computed. The length of the variable vector that lead to the minimum value over the selected range estimates the blur width between images. The sum of absolute differences can be replaced by the sum of squared differences. Generally, it obtains curves with deeper local minimums, but it has an increased numerical complexity. Also, to achieve advantageous accuracy, both horizontal and vertical projection profiles can be used. In this case, the minimum of the sum of both horizontal and vertical sums of absolute differences indicates a suitable filter length. The vectors used for convolution may be the integral projection vectors of blur kernels with different widths. The out-of focus blur function may be modeled as:

$$h(x,y)=1/\pi R^2, \text{ if } R \geq [x^2+y^2]^{1/2}, \text{ while } h(x,y)=0, \text{ otherwise.}$$

Figure 1B:
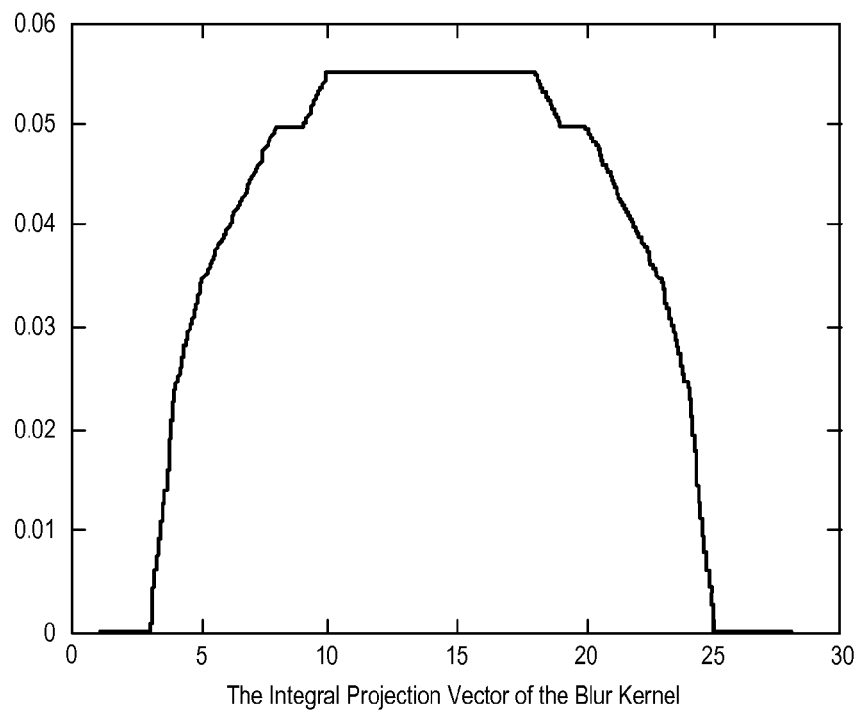
FIG. 1b, illustrates a representation of an integral projection vector of a blur kernel in accordance with certain embodiments.

In this case, R is the radius of the blur circle (see, e.g., M. E. Moghaddam, "Out of focus blur estimation using genetic algorithm," in *Proc. 15th International Conf on Systems, Signals and Image Processing*, pp. 417-420, IWSSIP 2008, hereby incorporated by reference). FIG. 1*a* illustrates a representation of an example of such out-of-focus blur function, while FIG. 1*b* illustrates a representation of the integral projection vector obtained by summing its columns. Also, the out-of-focus blur kernel can be approximated with a Gaussian kernel or a circular averaging filter, among several possible types of kernels that may be used. For a specific camera calibration, variable width integral projection vectors can be obtained by the sum of unfocused pictures of one horizontal black line on a white paper, followed by a normalization step.

Referring now to FIG. 1*a*, a representation of a blur kernel of width equal to eleven (11) is illustrated by example in accordance with certain embodiments. A three-dimensional rendering of the example blur kernel is provided in FIG. 1*a*. The 3d representation of the blur kernel in FIG. 1*a*, has dimensions of around 30, in two dimensions and a height around 0.003.

Referring now to FIG. 1*b*, a representation of an integral projection vector of a blur kernel is illustrated in accordance with certain embodiments. The 2d representation of the integral projection vector in FIG. 1*b*, is substantially symmetric with width around 22, and height around 0.06, with steps around 0.05, on either side of the symmetric axis around 8, and 20.

Figure 2:
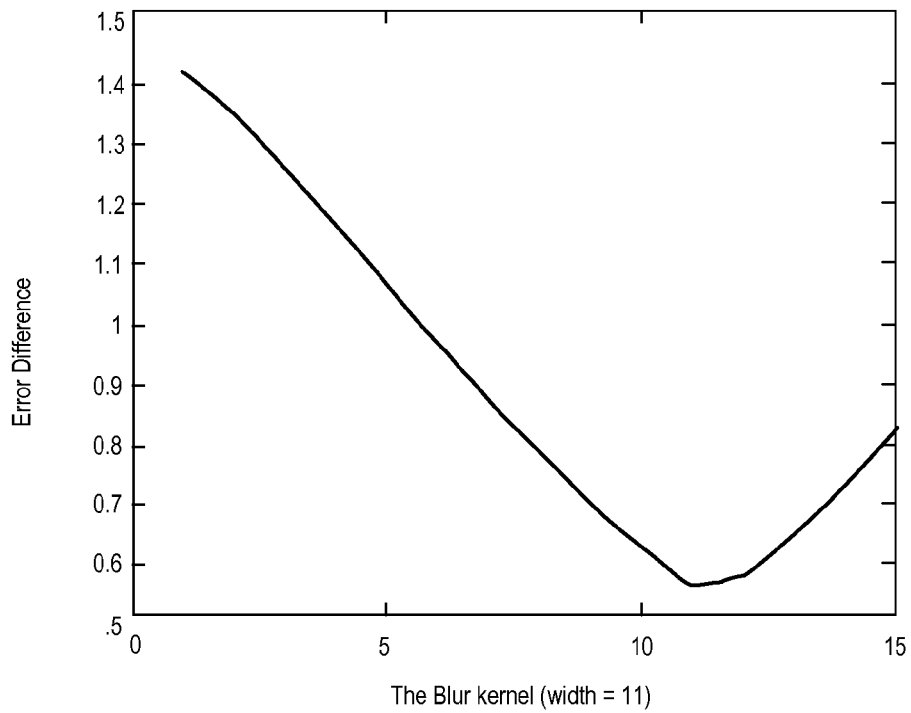
FIG. 2 is a plot illustrating the sum of the absolute difference between convoluted integral projection vectors of a sharpest image and integral projection vectors of a second image in accordance with certain embodiments.

Referring to FIG. 2, a plot of error difference versus filter width is illustrated as a result of application of a technique in accordance with certain embodiments. In the example of FIG. 2, the technique is applied on an original image and a blurred one obtained by its convolution with the blur kernel from FIG. 1*a*. The widths of the filters are varied from 1to 15. Therefore 15 differently filtered integral projection vectors are obtained in this example with these out-of-focus projection blurs and compared with the integral projection vectors of the second image.

The plot shown in FIG. 2 is approximately linear with negative slope from an error difference of $1.4 \times 10^6$ at a filter width of 1to an error difference of $0.6 \times 10^6$ at a filter width of 11. The plot changes abruptly to positive slope at a filter width of 11, which is the approximate value of the minimum of the plot of FIG. 2, and has an error difference of $0.8 \times 10^6$ at a filter width of 15.

FIG. 2 shows a plot illustrating the sum of the absolute difference between convoluted integral projection vectors of a sharpest image and integral projection vectors of a second image in accordance with certain embodiments. Both horizontal and vertical profiles were used in this example.

It is not necessary to calculate both horizontal and vertical IPV. Instead, it is optional as illustrated at FIG. 2. Instead, a single integral projection vector may be calculated. Along the same lines of thinking as one may consider partly rotating an image prior to calculating integral projection vectors, effectively a single "diagonal" integral projection vector of an original image may be calculated. This may be implemented as a dedicated or combinational hardware process. Thus, the calculation of both horizontal and vertical integral projection vectors is provided in certain embodiments, while calculation of a single diagonal integral projection vector is provided in certain other embodiments. Other combinations are possible, such that techniques in accordance with embodiments involve calculation of one or more of a horizontal, a vertical and/or a diagonal integral projection vector.

The diagonal integral projection vector may be provided by considering the radial nature of the blur. One or more integral projection vectors can be computed at any of a variety of angles. Integral projection vectors may be related to the Radon transform. The horizontal and vertical integral projection vectors may be most efficient to compute, however, as they do not involve rotating the images.

In several embodiments, an integral projection pair is computed, including horizontal, vertical and/or diagonal. A robust embodiment involves calculation of two or more of horizontal, vertical and diagonal integral projection vectors. An example would be a binary image with a vertical or horizontal edge. In this case, it is desired to calculate two integral projection vector pairs to detect this.

It can be seen from FIG. 2 that the minimum corresponds to the blur width. The profiles can be downscaled in order to reduce the complexity of the calculation or the length of the full resolution profiles can be cropped. Also, a descent algorithm can be used in order to reduce the number of computations and not perform a full search on all investigated width values. Local minima can be avoided by computing the error at different interval lengths. In this case, the interval length may be reduced until it is small enough. At each step, the width with the smallest error is chosen as a central point in the next interval of three width values.

The procedure may be repeated with the previous sharpest image and a subsequent image. The sequence of blur width values gives important information related to the autofocus system about the direction of looking to focus and closeness to it. For example, if the estimated width values are high, the electromechanical system can take high adjustment for the focus of the optical system. In case of small consecutive widths, the system might need minor adjustment.

A typical scenario of usage for such blur kernel size goes as follows. The image for the current focus level and another image with a different focus level are taken and run through the algorithm. An estimate of how big the focus kernel difference is between the two can be determined. With that information and a lookup table with calibration data from the sensor and lens, an approximate focus level position can be computed which will be close enough to the ideal one for most applications. During the next steps, a constant number of images are captured with focus levels close to the "ideal" guessed position. The best match, according to a gradient method, will be the desired "ideal" focus.

Using this method, a constant number of steps may be used to determine the best focus for a given scene. This has advantageous application to real time systems and also presents an improvement over existing methods which are typically not strongly bounded in the number of steps.

Techniques in accordance with embodiments described herein can work on gradient images too. In one embodiment, an integral projection of blur kernel is approximated with a box filter. A threshold may be imposed to the sum of the columns of the blur kernel. Advantageous results can be found by using the half of the maximum value. The resulting vector may be normalized in order to have a unity sum value.

Figure 3:
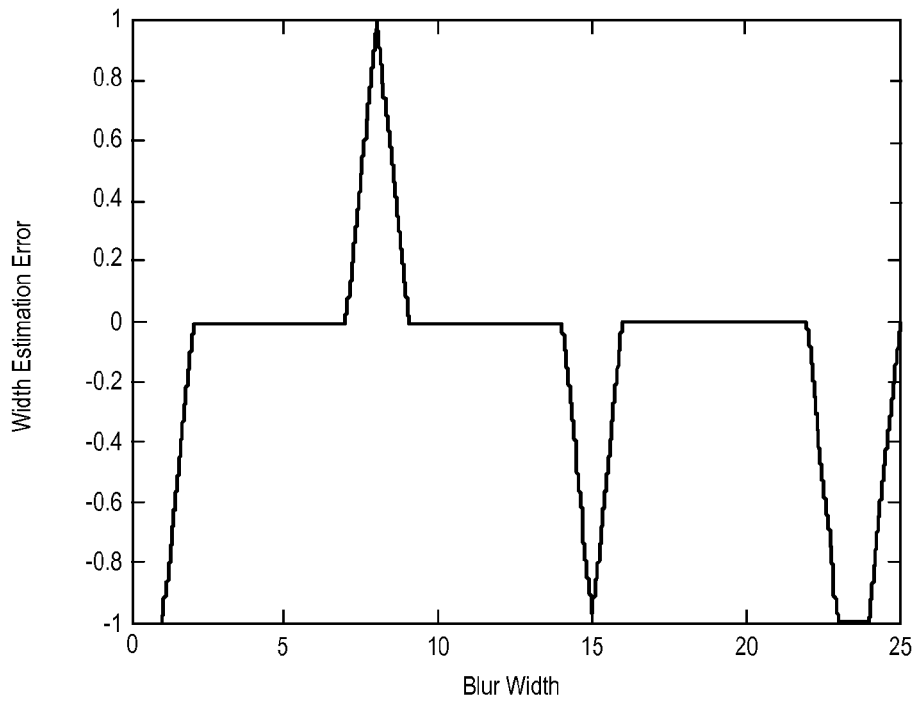
FIG. 3 is a plot illustrating a simulated width estimation error computed for blur widths varied from 1to 25, in accordance with certain embodiments.

FIG. 3 shows a simulated example where the width is varied from 1 to 25. The maximum width estimation error is one. The threshold and image content have an important role in the accuracy of the width estimation. An approximation to the length of the boxcar vector as a function of the chosen circular blur width, L, in case of using a threshold 0.5, is given by $N=\lfloor 1.75 \times L - 0.75 \rfloor$, where $\lfloor x \rfloor$ is the integer part of $x$.

FIG. 3 is a plot illustrating a simulated width estimation error computed for blur widths varied from 1 to 25, in accordance with certain embodiments.

Figure 4:
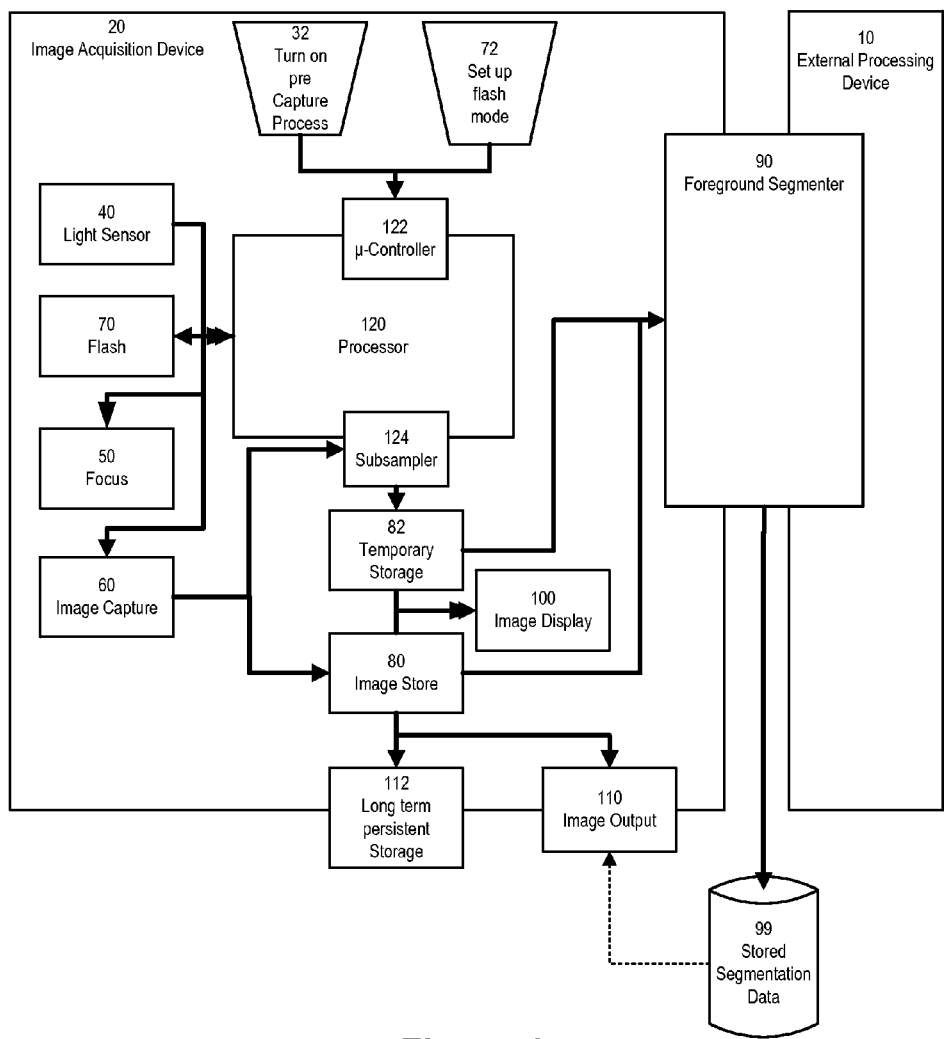
FIG. 4 is a block diagram of a camera apparatus in accordance with an embodiment.

FIG. 4 shows a block diagram of an image acquisition device 20 operating in accordance with an embodiment. The digital acquisition device 20, which in the present embodiment is a portable digital camera, includes a processor 120. It can be appreciated that many of the processes implemented in the digital camera may be implemented in or controlled by software operating in a microprocessor, central processing unit, controller, digital signal processor and/or an application specific integrated circuit, collectively depicted as block 120 labeled "processor". Generically, user interface and control of peripheral components such as buttons and display is controlled by a µ-controller 122.

The processor 120, in response to a user input at 122, such as half pressing a shutter button (pre-capture mode 32), initiates and controls the digital photographic process. Ambient light exposure is determined using light sensor 40 in order to automatically determine if a flash is to be used. The distance to the subject is determined using focusing means 50 which also focuses the image on image capture component 60. If a flash is to be used, processor 120 causes the flash 70 to generate a photographic flash in substantial coincidence with the recording of the image by image capture component 60 upon full depression of the shutter button.

The image capture component 60 digitally records the image in color. The image capture component 60 is known to those familiar with the art and may include a CCD (charge coupled device) or CMOS to facilitate digital recording. The flash may be selectively generated either in response to the light sensor 40 or a manual input 72 from the user of the camera. The image I(x,y) recorded by image capture component 60 is stored in image store component 80 which may comprise computer memory such a dynamic random access memory or a non-volatile memory. The camera is equipped with a display 100, such as an LCD, for preview and postview of images.

In the case of preview images P(x,y), which are generated in the pre-capture mode 32 with the shutter button half-pressed, the display 100 can assist the user in composing the image, as well as being used to determine focusing and exposure. A temporary storage space 82 is used to store one or plurality of the preview images and can be part of the image store means 80 or a separate component. The preview image is usually generated by the image capture component 60. Parameters of the preview image may be recorded for later use when equating the ambient conditions with the final image. Alternatively, the parameters may be determined to match those of the consequently captured, full resolution image. For speed and memory efficiency reasons, preview images may be generated by subsampling a raw captured image using software 124 which can be part of a general processor 120 or dedicated hardware or combination thereof, before displaying or storing the preview image. The sub sampling may be for horizontal, vertical or a combination of the two. Depending on the settings of this hardware subsystem, the pre-acquisition image processing may satisfy some predetermined test criteria prior to storing a preview image. Such test criteria may be chronological—such as to constantly replace the previous saved preview image with a new captured preview image every 0.5, seconds during the pre-capture mode 32, until the final full resolution image I(x,y) is captured by full depression of the shutter button. More sophisticated criteria may involve analysis of the of the preview image content, for example, testing the image for changes, or the detection of faces in the image before deciding whether the new preview image should replace a previously saved image. Other criteria may be based on image analysis such as the sharpness, detection of eyes or metadata analysis such as the exposure condition, whether a flash is going to happen, and/or the distance to the subjects.

If test criteria are not met, the camera continues by capturing the next preview image without saving the current one. The process continues until the final full resolution image I(x,y) is acquired and saved by fully depressing the shutter button.

Where multiple preview images can be saved, a new preview image will be placed on a chronological First In First Out (FIFO) stack, until the user takes the final picture. The reason for storing multiple preview images is that the last image, or any single image, may not be the best reference image for comparison with the final full resolution image in. By storing multiple images, a better reference image can be achieved, and a closer alignment between the preview and the final captured image can be achieved in an alignment stage discussed further in relation to FIGS. 2(*a*)-2(*c*) of U.S. Pat. No. 7,606,417and FIG. 4 of the present application which is a reproduction of FIG. 1 from the '417 patent. Other reasons for capturing multiple images are that a single image may be blurred due to motion, the focus not being set, and/or the exposure not being set.

In an alternative embodiment, the multiple images may be a combination of preview images, which are images captured prior to the main full resolution image and postview images, which are image or images captured after said main image. In one embodiment, multiple preview images may assist in creating a single higher quality reference image; either higher resolution or by taking different portions of different regions from the multiple images.

A segmentation filter 90 analyzes the stored image I(x,y) for foreground and background characteristics before forwarding the image along with its foreground/background segmentation information 99 for further processing or display. The filter 90 can be integral to the camera 20 or part of an external processing device 10 such as a desktop computer, a hand held device, a cell phone handset or a server. In this embodiment, the segmentation filter 90 receives the captured image I(x,y) from the full resolution image storage 80 as well as one or a plurality of preview images P(x,y) from the temporary storage 82.

The image I(x,y) as captured, segmented and/or further processed may be either displayed on image display 100, saved on a persistent storage 112 which can be internal or a removable storage such as CF card, SD card, USB dongle, or the like, or downloaded to another device, such as a personal computer, server or printer via image output component 110 which can be tethered or wireless. The segmentation data may also be stored 99 either in the image header, as a separate file, or forwarded to another function which uses this information for image manipulation.

In embodiments where the segmentation filter 90 is implemented in an external application in a separate device 10, such as a desktop computer, the final captured image I(x,y) stored in block 80 along with a representation of the preview image as temporarily stored in 82, may be stored prior to modification on the storage device 112, or transferred together via the image output component 110 onto the external device 10, later to be processed by the segmentation filter 90. The preview image or multiple images, also referred to as sprite-images, may be pre-processed prior to storage, to improve compression rate, remove redundant data between images, align or color compress data.

The method can be extended in a more general case of finding the PSF support size in case of a pair of available images including an under-exposed image and a blurred image.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments. In addition, features described at any of U.S. Pat. Nos. 7,660,478, 7,639,889, 7,636,486, 7,639,888, 7,697,778, 7,773,118, 7,676,108, 7,362,368, 7,692,696, 7,317,815, 7,676,108, 7,687,778, 7,606,417, 7,680,342, 7,796,822, 7,634,109, 7,787,022, 7,474,341, 7,352,394, 7,636,486, and 6,407,777, and/or United States published patent applications nos. 2008/0143854, 2010/0039525, 2009/0303342, 2009/0303343, 2009/0273685, 2009/0196466, 2008/0316328, 2009/0179998, 2009/0115915, 2009/0080713, 2009/0003708, 2009/0003661, 2009/0002514, 2008/0317379, 2008/0143854, 2008/0043121, 2011/0013044, 2011/0002545, 2009/0167893, 2008/0309769, 2008/0219581, 2009/0179999, 2007/0269108, 2008/0219581, 2008/0309770, and 2007/0296833, and U.S. patent applications Ser. Nos. 12/944,701, 12/944,703, 12/901,577, 12/820,002, 12/820,034, 12/820,086, and 12/959,320, which are hereby incorporated by reference, may be used in alternative embodiments.

What is claimed is:

1. A method of automatically focusing an image acquisition device on a scene, comprising the steps of:
   (a) acquiring multiple images each having a focusing means of the an image acquisition device focused at a different focus distance;
   (b) determining a sharpest image among the multiple images;
   (c) computing horizontal, vertical or diagonal integral projection vectors, or combinations thereof, for each of the multiple images;
   (d) convoluting one or more integral projection vectors of the sharpest image with multiple filters of different lengths to generate one or more filtered integral projection vectors for the sharpest image;
   (e) computing differences between the one or more filtered integral projection vectors of the sharpest image and one or more integral projection vectors of at least one of the other images of the multiple images;
   (f) estimating at least one blur width between the sharpest image and the at least one of the other images of the multiple images as a minimum value among the computed differences over a selected range;
   (g) repeating steps (b)-(f) one or more times to obtain a sequence of estimated blur width values; and
   (h) adjusting a focus position based on the sequence of estimated blur width values.

2. The method of claim 1, wherein the determining said sharpest image comprises a gradient image-based process.

3. The method of claim 1, wherein the differences comprise absolute sums of differences.

4. The method of claim 1, wherein the differences comprise sums of squared differences.

5. The method of claim 1, wherein the multiple filters of different lengths comprise integral projection vectors of blur kernels of different widths.

6. The method of claim 5, wherein the blur kernels comprise Gaussian or circular averaging kernels, or combinations thereof.

7. The method of claim 1, further comprising downscaling or cropping lengths of the integral projection vectors in order to reduce complexity.

8. The method of claim 1, further comprising applying a descent process to reduce a number of computations.

9. The method of claim 1, further comprising computing errors at different interval lengths in order to avoid one or more local minima.

10. The method of claim 1, wherein the adjusting of the focus position comprises a smaller or greater adjustment, respectively, for smaller or greater estimated blur width values.

11. The method of claim 1, further comprising:
estimating a focus kernel difference between the sharpest image and the at least one of the other images of the multiple images; and
computing an approximate focus level position based on the estimated focus kernel difference.

12. The method of claim 11, further comprising refining the focus level position by acquiring one or more images close to the approximate focus level position and applying a gradient method to determine a best match.

13. A image acquisition device that automatically focuses on a scene, comprising:
(a) a focusing means and image capture component for acquiring multiple images each having the focusing means focused at a different focus distance;
(b) a processor
programmed to perform an autofocus method, including the steps of:
(i) determining a sharpest image among the multiple images;
(ii) computing horizontal, vertical or diagonal integral projection vectors, or combinations thereof, for each of the multiple images;
(iii) convoluting one or more integral projection vectors of the sharpest image with multiple filters of different lengths to generate one or more filtered integral projection vectors for the sharpest image;
(iv) computing differences between the one or more filtered integral projection vectors of the sharpest image and one or more integral projection vectors of at least one of the other images of the multiple images;
(v) estimating at least one blur width between the sharpest image and the at least one of the other images of the multiple images as a minimum value among the computed differences over a selected range;
(vi) repeating steps (i)-(v) one or more times to obtain a sequence of estimated blur width values; and
(vii) adjusting a focus position based on the sequence of estimated blur width values.

14. The device of claim 13, wherein the determining said sharpest image comprises a gradient image-based process.

15. The device of claim 13, wherein the differences comprise absolute sums of differences.

16. The device of claim 13, wherein the differences comprise sums of squared differences.

17. The device of claim 13, wherein the multiple filters of different lengths comprise integral projection vectors of blur kernels of different widths.

18. The device of claim 17, wherein the blur kernels comprise Gaussian or circular averaging kernels, or combinations thereof.

19. The device of claim 13, wherein the method further comprises downscaling or cropping lengths of the integral projection vectors in order to reduce complexity.

20. The device of claim 13, wherein the method further comprises applying a descent process to reduce a number of computations.

21. The device of claim 13, wherein the method further comprises computing errors at different interval lengths in order to avoid one or more local minima.

22. The device of claim 13, wherein the adjusting of the focus position comprises a smaller or greater adjustment, respectively, for smaller or greater estimated blur width values.

23. The device of claim 13, wherein the method further comprises:
estimating a focus kernel difference between the sharpest image and the at least one of the other images of the multiple images; and
computing an approximate focus level position based on the estimated focus kernel difference.

24. The device of claim 23, wherein the method further comprises refining the focus level position by acquiring one or more images close to the approximate focus level position and applying a gradient method to determine a best match.

25. One or more non-transitory, processor-readable devices having code embedded therein for programming a processor to perform a method of automatically focusing an image acquisition device on a scene, the method comprising the steps of:
(a) acquiring multiple images each having a focusing means of an image acquisition device focused at a different focus distance;
(b) determining a sharpest image among the multiple images;
(c) computing horizontal, vertical or diagonal integral projection vectors, or combinations thereof, for each of the multiple images;
(d) convoluting one or more integral projection vectors of the sharpest image with multiple filters of different lengths to generate one or more filtered integral projection vectors for the sharpest image;
(e) computing differences between the one or more filtered integral projection vectors of the sharpest image and one or more integral projection vectors of at least one of the other images of the multiple images;
(f) estimating at least one blur width between the sharpest image and the at least one of the other images of the multiple images as a minimum value among the computed differences over a selected range;
(g) repeating steps (b)-(f) one or more times to obtain a sequence of estimated blur width values; and
(h) adjusting a focus position based on the sequence of estimated blur width values.

26. The one or more non-transitory, processor-readable media of claim 25, wherein the determining said sharpest image comprises a gradient image-based process.

27. The one or more non-transitory, processor-readable media of claim 25, wherein the differences comprise absolute sums of differences.

28. The one or more non-transitory, processor-readable media of claim 25, wherein the differences comprise sums of squared differences.

29. The one or more non-transitory, processor-readable media of claim 25, wherein the multiple filters of different lengths comprise integral projection vectors of blur kernels of different widths.

30. The one or more non-transitory, processor-readable media of claim 29, wherein the blur kernels comprise Gaussian or circular averaging kernels, or combinations thereof.

31. The one or more non-transitory, processor-readable media of claim 25, wherein the method further comprises downscaling or cropping lengths of the integral projection vectors in order to reduce complexity.

32. The one or more non-transitory, processor-readable media of claim 25, wherein the method further comprises applying a descent process to reduce a number of computations.

33. The one or more non-transitory, processor-readable media of claim 25, wherein the method further comprises computing errors at different interval lengths in order to avoid one or more local minima.

34. The one or more non-transitory, processor-readable media of claim 25, wherein the adjusting of the focus position comprises a smaller or greater adjustment, respectively, for smaller or greater estimated blur width values.

35. The one or more non-transitory, processor-readable media of claim 25, wherein the method further comprises:
   estimating a focus kernel difference between the sharpest image and the at least one of the other images of the multiple images; and
   computing an approximate focus level position based on the estimated focus kernel difference.

36. The one or more non-transitory, processor-readable media of claim 35, wherein the method further comprises refining the focus level position by acquiring one or more images close to the approximate focus level position and applying a gradient method to determine a best match.

* * * * *